United States Patent [19]

Cobb

[11] 4,272,028
[45] Jun. 9, 1981

[54] SPREADER FOR AND OPERATIVE BY A GRANULAR PRODUCT

[76] Inventor: Wayne E. Cobb, 358 Harrison St., Valparaiso, Ind. 46383

[21] Appl. No.: 962,126

[22] Filed: Nov. 20, 1978

Related U.S. Application Data

[63] Continuation of Ser. No. 758,209, Jan. 10, 1977, abandoned.

[51] Int. Cl.$^3$ .............................................. A01C 17/00
[52] U.S. Cl. .................................... 239/687; 414/301; 406/162
[58] Field of Search ................... 239/222.17, 681, 687; 302/60; 198/638, 642; 308/135, 139, 147; 414/301

[56] References Cited

U.S. PATENT DOCUMENTS

| | | | |
|---|---|---|---|
| 1,691,683 | 11/1928 | Townsend | 198/642 X |
| 3,064,833 | 11/1962 | Von Ruden | 414/301 |
| 3,151,750 | 10/1964 | Nold | 414/301 |
| 3,315,823 | 4/1967 | Rikoff | 239/687 |
| 3,791,592 | 2/1974 | Cobb | 239/687 X |

FOREIGN PATENT DOCUMENTS

609549 7/1956 Fed. Rep. of Germany.

Primary Examiner—Robert W. Saifer
Attorney, Agent, or Firm—Charles S. Penfold

[57] ABSTRACT

The subject invention is directed to a spreader adapted for support in an upper entrance or inlet of a storage facility or bin for spreading and depositing the product in a circular area to a substantially uniform depth and comprises a hopper or funnel for initially receiving the product and an impeller which is propelled or operated by the downward force of the product.

31 Claims, 8 Drawing Figures

SPREADER FOR AND OPERATIVE BY A GRANULAR PRODUCT

This Application is a continuation of my Application Ser. No. 758,209 filed Jan. 10, 1977 now abandoned.

BACKGROUND OF INVENTION

It is recognized that quite a number of Patents have issued which are directed to spreaders, which are propelled by a granular product, such as J. C. Perry U.S. Pat. No. 797,073 dated Aug. 15, 1905; H. A. Townsend U.S. Pat. No. 1,691,683 dated Nov. 13, 1928; as distinguished from those which are power operated, such as Netherland's Patent to Geesink No. 50,574 dated Jan. 15, 1941; J. C. Howland U.S. Pat. No. 1,763, 396 dated June 10, 1930; R. E. Von Ruden U.S. Pat. No. 3,064,833 dated Nov. 20, 1962; H. J. Donelson Jr. U.S. Pat. No. 3,248,117 dated Apr. 26, 1966 and U.S. Pat. No. 3,283,591 dated Nov. 1, 1966; C. D. Neuenschwander U.S. Pat. No. 3,488,007 dated Jan. 6, 1970; Wayne E. Cobb U.S. Pat. No. 3,791,592 dated Feb. 12, 1974; and Arthur L. Faussauer U.S. Pat. No. 3,804,303 dated Apr. 16, 1974. The disclosures in these Patents have been examined and it is believed that the invention or inventions as defined in the subject application constitute a meritorious advance in the art.

OBJECTIVES

One of the important objects of the subject invention is to provide a spreader which preferably comprises a hopper or funnel for initially receiving a granular product and which is provided with a lower outlet or discharge opening and an impeller embodying improved principles of design and construction which is rotatably mounted on a vertical shaft which is supported in the hopper and extends downwardly through the outlet.

A significant objective is to provide a spreader of the character alluded to in the preceding paragraph, in which the hopper is of a conical shape, comprised of sections, and provided with supports which are connected to the upper part of the hopper for supporting the spreader on the bin; with radially disposed brackets which support the shaft; and means which serves to connect the hopper sections and brackets thereto.

A particularly significant objective of the invention is to provide an impeller structure of substantially conical shape which is constructed to provide different areas or zones of inclination or sloping contours whereby to cause spreading of the product in variable patterns and distances from a vertical axis about which the structure rotates. Otherwise expressed, the product is dispersed or spread at variable patterns, and/or angles or directions and at variable speeds to form a substantially uniform layer or pile of deposit.

A particularly importnt object is to construct an impeller or subassembly of a spreader preferably comprising a pair of half sections which substantially form a generally conical, oblong or oval structure and blades which are carried thereby for engagement by the driving force of a product to impart rotation to the subassembly and cause spreading of the product. In other words, the subassembly or impeller is propelled or rotated by the product and disperses the product, without utilizing a power unit for driving the impeller.

A specific object is to provide an oblong or oval conically shaped impeller as described above whereby to impart a generally variable, wavelike or undulating dispersal pattern or conical patterns to the product; afford utilization of structure having a larger dispersal surface, as compared to a true annular one; and facilitate its entry into the upper inlet opening in the bin.

Another specific object is to provide the impeller structure with openings for the flow of some of the product therethrough to promote its deposit in the center area of a storage bin.

Another significant objective of the invention is to provide a bearing means and coupling structure, embodying improved principles of design and construction, for rotatably supporting the impeller or subassembly with respect to the axis of a shaft which shaft is preferably stationary.

Also, an object is to provide a pair of axially spaced bearing means operatively related to a shaft of the spreader whereby to facilitate rotation of the impeller above referred to.

Another object is to provide a spreader comprising a hopper and an impeller rotatably mounted with respect thereto and in which the maximum cross-sectional dimension of the impeller is somewhat greater than the maximum cross-section of the hopper.

A further object is to provide a bearing subassembly for use in a spreader which includes a pair of bearing members of elements which may be reversibly mounted with respect to one another and in which one of these elements is of such a character that it will automatically adjust, deform or accommodate itself to the other element in response to wear resullting from the variable rotational speeds of the impeller and pressures exerted thereon by the inflow of the product.

Also, an object is to provide a spreader which offers advantages with respect to cost of manufacture and assembly, economical operation, efficiency as to capacity, and durability.

Additional objects and advantages of the invention will become apparent after the description hereinafter set forth is considered in conjunction with the drawings annexed hereto.

DESCRIPTION

Figures 1, 2, 3, 4:
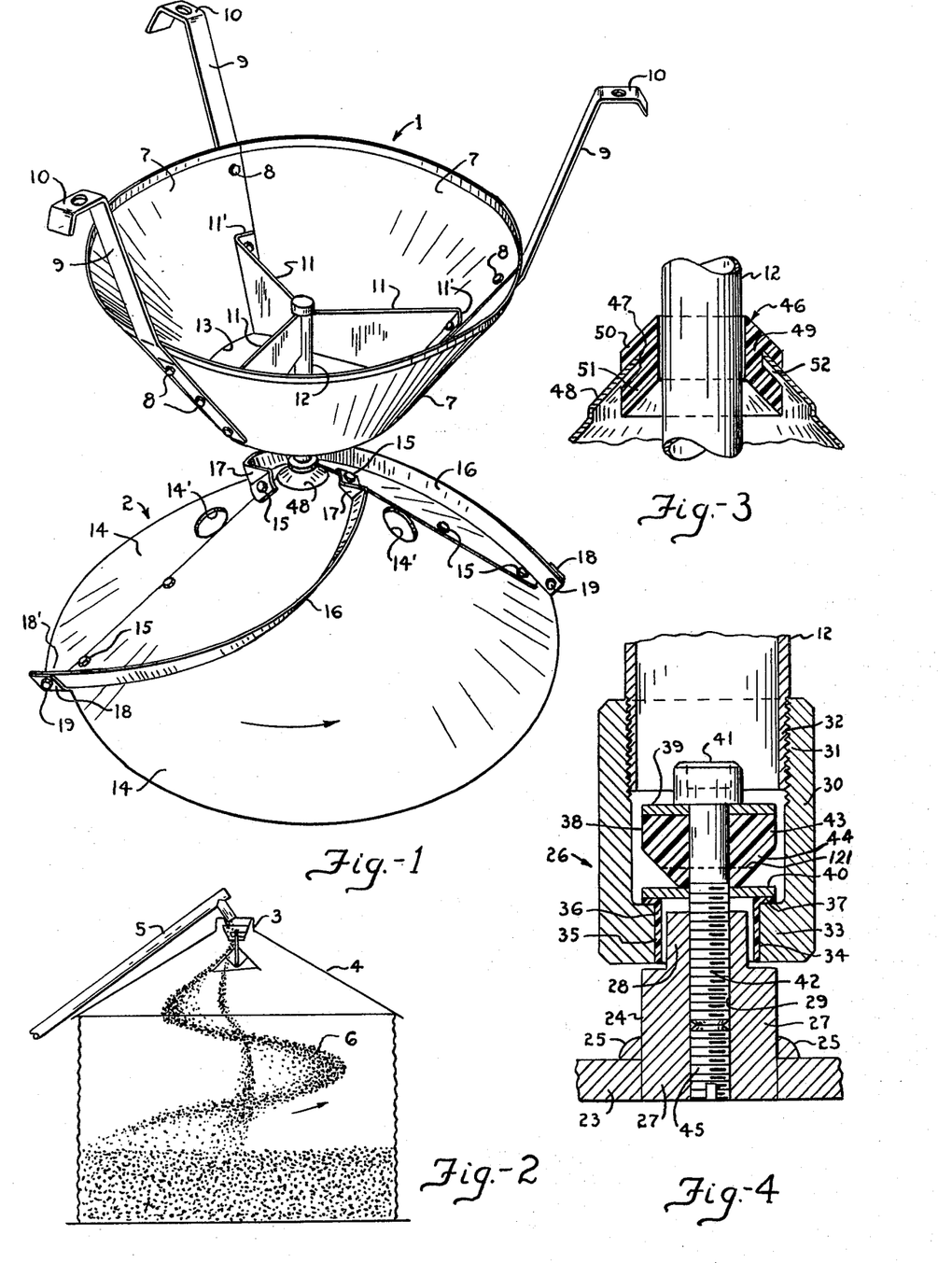
FIG. 1 is a pictorial view of the spreader.
FIG. 2 is a partial vertical view of a storage facility showing the spreader mounted thereon, including a conduit for delivering a granular product into the spreader.
FIG. 3 is a partial sectional view showing a bearing interposed between a shaft and an annular edge of an opening provided in the impeller.
FIG. 4 is a vertical section depicting the operatively related components or parts of an improved bearing means or coupling assembly whereby to facilitate rotation of the impeller.

The spreader generally described above comprises an upper generally conical hopper or funnel structure generally designated 1 constituting a subassembly, and a substantially conical impeller or structure generally designated 2 constituting a subassembly. The spreader is adapted for disposition in an inlet opening 3 provided in the upper part of a relatively large storage bin 4. A conduit 5 is customarily employed to feed a granular product 6, preferably grain, into the hopper 1 as depicted in FIG. 2.

The hopper 1 may be designed and constructed as desired but is preferably comprised of three curved sections or sectors 7 of sheet material which are secured togehter by fastening means, such as bolts 8, which also serve to detachably and adjustably secure three external supports or arms 9 to the hopper for supporting the spreader in the inlet opening 3. These supports preferably include upper hooks 10 which rest on a rim defining the opening 3 in the bin and lower apertured extremities which are secured by certain of the bolts 8 against overlapping edge portions of the sections for reinforcing the hopper at circumferentially spaced locations. The bolts extend through holes provided therefor in the overlapping portions of the sections and through the apertured extremities of the supports for holding the parts assembled.

The hopper 1 is also preferably provided with three internal radial brackets or partitions 11 which have outer flanges 11' which are provided with apertures through which certain of the bolts 8 extend to serve the threefold purpose of securing the sections, supports, and brackets assembled. The inner portions of the brackets 11 afford a support for an upper extremity of a vertical shaft 12 by welding or otherwise securing the shaft thereto in a fixed central position in an outlet 13 of the hopper and so that a lower extremity thereof is disposed in a depending position below the outlet. Attention is directed to the fact that the brackets and upper portion of the shaft are preferably arranged in the lower interior area of the hopper and that the brackets not only serve to support the shaft and impeller structure but also assist in breaking up the inflow of the product and equalize its distribution toward the outlet 13.

The impeller or structure 2, is substantially conical in shape, as alluded to above, and preferably comprised of two curved half sections or sectors 14 which are preferably connected together by fastening means, such as bolts 15 which extend through apertures provided therefor in overlapping edge portions of the sections. This impeller, due to its general oblong or oval shape affords a greater surface area for engagement by the product 6 to promote its dispersion as compared to a true cone and facilitate its manipulation into the bin inlet 3.

The impeller is preferably provided with a pair of blades 16 which may be designed and constructed as desired, but each preferably comprises an elongated narrow spirally curved member having a substantially uniform thickness and uniform width. The blades have upper offsets 17 which are provided with apertures through which certain of the bolts 15 extend for fastening the upper ends of the blades to the impeller and with lower ends provided with holes which mate with holes provided in a pair of apertured ears or offsets 18 respectively provided on outwardly extending lower portions 18' formed on the sections 14 so that bolts 19 can be extended through these apertures for securing the lower ends of the blades to the impeller. These blades or members are preferably so mounted that inner edge portions thereof are held against or relatively close to the external conical surface area or areas of the impeller. The blades may be constructed into a pre-curved spiral condition or they may be of such a character they can be flexed for attachment to the impeller. The blades have inner concave and convex smooth surfaces. The impeller has proven satisfactory in actual use by utilizing one, two and three blades for propelling purposes and distributing the product.

Figures 5, 6, 7, 8:
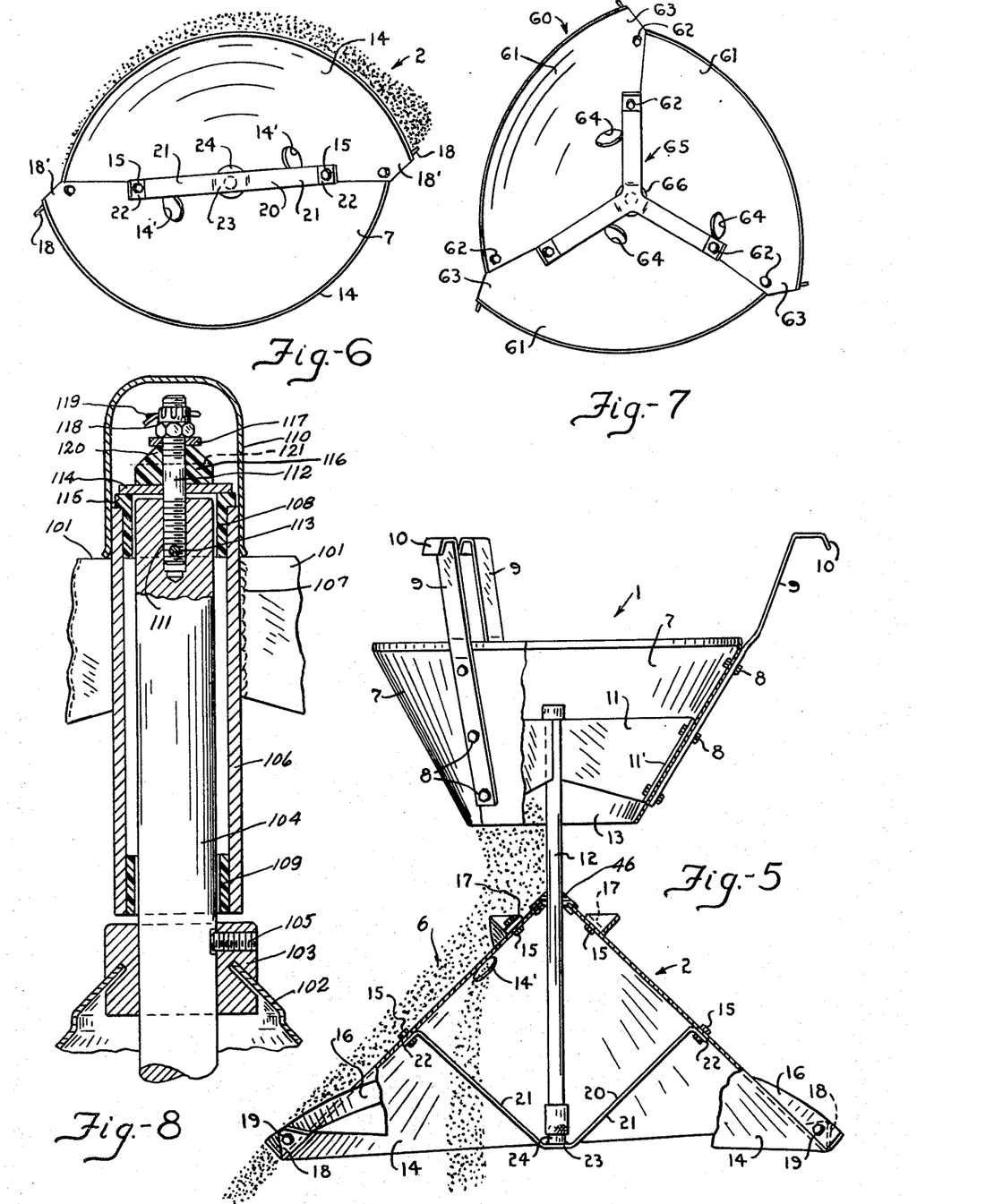
FIG. 5 is a vertical section taken through the spreader shown in FIG. 1.
FIG. 6 is a bottom or interior view of the impeller depicted in FIGS. 1 and 5.
FIG. 7 is a bottom or interior view of a modified impeller.
FIG. 8 is a partial vertical section of a modified bearing assembly or connecting means which may be utilized in conjunction with the spreader.

Attention is directed to the fact that the general oblong or oval shape of the impeller is due to the fact that the half sections 14, as best shown in FIG. 6, are preferably held in an offset assembled relationship and so that the lower portion 18' of one section will project or be offset outwardly with respect to an adjacent portion of the other and that these projecting portions 18' are provided with the offsets 18 above referred to. Such slope is also due to the fact that each section is generally of a semi-oval character.

Of further importance is the fact that the overlapping portions of the sections provide substantially diametrically spaced upper smooth sloping surfaces which are more or less planar or flat and that those portions of the impeller which are located between these planar areas provide upper convex smooth sloping surfaces which are appreciably greater in area and slope or are inclined to a greater extent than that of the planar surfaces. Otherwise, expressed, the impeller is provided with upper product engaging surfaces or areas of variable contour and slope and this structure in combination with the offsets 18' and lower offset ends of the blades serve to impart variable flow patterns of the product therefrom.

It is to be understood that the impeller may be comprised of the pair of sections 14, as alluded to above, or it may be on a one-piece construction or in three sections or more as will be described subsequently.

Attention is also directed to the fact that the impeller is also preferably provided with openings 14' respectively provided in the upper portion of each of the sections 14 as shown in FIG. 1, whereby to facilitate flow of some of the product through these openings for deposit in a central area of the bin is to obtain a more uniform level or layer of the product therein.

In addition to the above, the impeller is also provided with an upper opening through which the shaft 12 extends and with an internal generally V-shaped brace or support 20, as shown in FIGS. 5 and 6, which comprises a pair of arms 21 having upper apertured offsets 22 which are secured to the impeller by certain of the bolts 15. The arms are joined by a lower bridge portion 23. A support, fitting, post or member 24 is preferably fixedly secured in an upright position on the bridge 23 by welds 25 or by other means. The fitting constitutes a component or part of a coupling assembly or means generally designated 26 which will be described subsequently.

The coupling means 26 employed which affords relatively free rotation of the impeller with respect to the shaft 12 preferably comprises, among other things, the fitting 24, above referred to, which fitting has a large lower portion 27 and an upper reduced portion 28. This fitting is provided with an axially extending internally threaded aperture 29.

More particularly, the coupling 26 also preferably includes a hollow member, hollow enlargement or housing 30 having an upper internally threaded portion 31 which receives a threaded portion 32 of the shaft 12 and a lower relatively thick bottom end wall 33 provided with an axial opening 34 which receives the reduced portion 28 of the fitting 24. The cross-dimensions of the opening 34 and reduced portion 28 are predetermined in order to provide a cylindrical space which accommodates a tubular portion 35 of a bearing 36. This bearing also has a relatively thin radial flange 37 seated on the end wall 33 of the member 30.

The coupling further preferably comprises an upper thick bearing 38, a pair of upper and lower washers or members 39 and 40, and an elongated element having a head 41 and a threaded shank 42, the latter of which engages the threaded aperture 29 in the fitting 24. The bearings 36 and 38 may be constructed of any material suitable for the purpose but are preferably of a self-lubricating character. The members 39 and 40 and bearing 38 are preferably provided with apertures through which the elongated element extends, and the upper member 39 is held on the bearing 38 by the head 41 of the element and the lower member 40, constituting a bearing or abutment means, is interposed between the bearing 38 and the radial flange 37 of the bearing 36. The bearing 38 is preferably constructed to provide an upper cylindrical portion 43, having a diameter which substantially corresponds to the diameter or cross-dimension of the upper member 39, and a lower tapered portion 44 having a lower annular surface which is much less than that of the lower member 40 whereby to appreciably reduce the friction factor therebetween, and the annular contact area between the under surface of the lower member 40 and the radial flange 37 also offers a minimum of contact between this member and the bearing 35, all for the purpose of preferably reducing friction between the bearing 38 and the lower member 40 in order to promote or facilitate rotation of the impeller by the force of the falling product 6 onto the impeller and particularly against the blades 16. The member 40 is preferably constructed of stainless steel to prevent corrosion and may be constructed to constitute a race member. As will be described later, the operative position or location of the bearing 38 may be reversed.

Attention is directed to the fact that the area of contact between the bearing 38 and the lower member or bearing 40 is appreciably less than the contact area between this member and the radial flange 37 in order to afford a predetermined variable balance and stability therebetween. It should also be noted that the diameters or cross-dimensions of the bearing 38 and members 39 and 40 are somewhat less than the internal diameter or cross-dimension of the housing 30. Of further import is the fact that the elongated element or bolt 42 can be operated by manual or tool engaging its head 41 for the purpose of correctly adjusting the tolerances between the components and this adjustment can be readily locked in place by a set screw 45 secured in the axial aperture 29 in the support or fitting 24. It is to be understood that insofar as the relationship of the components of the coupling are concerned the preferred objective is to afford a setup whereby the impeller 2 and fitting 24 carried thereby, including the elongated element, member 39 and bearing 38 are adapted to rotate as a unit relative to the lower member or bearing 40 which supports or suspends the impeller for rotation relative to the axis of the shaft 12. It should be observed that the aforesaid unit is substantially supported on the lower member 40 and/or bearing 35 in a suspended or hung in an axial aligned position to the shaft 12 for relatively free rotation induced by the product flowing through the outlet 13 by gravity and the force exerted thereto by its flow through the conduit 5. The tolerances or dimensions of the components are also preferably such that there is some relative looseness therebetween in order to prevent any binding action which would interfere with the free rotation of the unit relative to the shaft 12. This looseness also affords a setup whereby the impeller is held in substantial axial alignment with the hopper in the event the spreader is inadvertently dropped and the impeller should become slightly misaligned with the hopper. Otherwise expressed, the opportunity for misalignment of the hopper and impeller constituting subassemblies of the spreader is reduced. This relationship of the components is preferably obtained by predetermining their cross-dimensions to provide balance, adequate clearance, and stablity, and the latter is particularly achieved by extending the upper reduced portion 28 of the fitting into the opening 34 in the end wall 33 of the housing in order to impart some reinforcement to prevent distortion of the elongated element, in the event the hopper and impeller inadvertently become misaligned. Whenever these components are not exactly aligned, the reduced portion of the fitting may engage the cylindrical portion 35 of the bearing 36 whereby to assist in controlling or maintaining the impeller in a correct operative position for rotation. In other words, the relationship serve to control any wobbling or off-center position of the impeller.

Additional bearing means generally designated 46 is provided whereby to assist in affording improved rotation of the impeller. The impeller is provided with an upper opening 47 as clearly shown in FIG. 3 and the bearing means is secured in this opening. More specifically, the uppermost portion of the impeller is preferably outset to provide what may be termed an upper relatively small conical formation 48 in which the opening 47 is provided. The bearing means is preferably of a generally frustoconical shape and includes a tubular cylindrical portion 49 or sleeve which surrounds the shaft 12, an upper conical portion 50 overlying the conical formation 48 and a lower conical portion 51 which underlies the formation 48. These upper and lower conical portions of the bearing are disposed in a parallel relation to provide a conical space 52 which receives a marginal portion or portions of the impeller defining the opening 47 whereby to hold the bearing means 36 in an operative position. This bearing means is preferably of a self-lubricating character like the bearing 35 and 38, alluded to above, and since it is spaced axially upwardly from the coupling or bearing means 26 therebelow, the impeller is well balanced or stabilized for efficient rotation by the product. In other words, these bearings serve to minimize friction in order to facilitate rotation of the impeller. The bearing means 46 may be mounted as shown by manipulating it between the half sections 14 as they are being assembled. Otherwise expressed, the bearing means is held in place by the sections and no additional fastening means is required. It should be noted that the upper conical portion 50 also serves to deflect or divert any falling product away from the shaft at its junction point with the impeller and thereby prevents any piling up of the product at the apex of the impeller. It may be stated that the bearing means 46 and the outset conical formation 48 separately or in combination serve to initially cause some of the product to be directed for travel against the upper portions of the blades 16 and thereby assist in promoting effective rotation of the impeller.

The bearing or coupling means 26 and 46 may be utilized with other forms of impellers, such as, for example, the modified impeller generally designated 60 exemplified in FIG. 7. This impeller comprises three sections or sectors 61 which have straight edge portions which are secured by bolts 62 or equivalent means to form a generally conical impeller having circumferentially spaced offset portions 63, similar to the offsets 18' on outwardly extending portions of the impeller 2 in FIG. 6, to which lower ends of three blades are attached. The impeller is also provided with an opening 64 in each of the sections and with a generally triangular support 65 having arms which are secured to the underside of the impeller by certain of the bolts which secure the sections together, and a fitting to 66 corresponding to the fitting 24 is preferably fixed to a center portion of the support. The openings 64 are preferably provided in the sections so they are staggered or located different radial distances from the center of the impeller in order to obtain variable spreading of the product therethrough.

Referring to FIG. 8 of the drawing there is disclosed a modified bearing assembly or means for connecting a hopper and impeller in an assembled relation.

More particularly, this FIGURE shows a pair of radial brackets 101 of three secured in a hopper or funnel (not shown) and an impeller 102 provided with an upper opening having a cylindrical bearing 103 fixedly secured therein and to a shaft 104 by a set screw 105. A tubular opening ended housing or casing 106 has an upper extremity preferably fixedly secured to the brackets 101 by welds 107. A top tubular bearing 108 is secured in the upper end and a lower tubular beaing 109 is secured in a lower end of the casing. These bearings are preferably of a self-lubricating character and surround the shaft 104 at axially spaced locations so that there is a cylindrical space therebetween in order to minimize the friction factor. It should be noted that an upper portion of the bearing assembly extends upwardly a relatively short distance above the brackets and that a cap 110 is fitted onto the upper end of the casing for protecting certain bearing elements or components which will not be described.

The upper end of the shaft 104 is preferably provided with an internally threaded aperture 111 which receives a threaded element 112 and is fixedly secured by a crosspin 113. A planar bearing, member or abutment means 114 is mounted on a radial flange 115 at the top bearing 108 in spaced relation to the upper end of the shaft and this flange overlies the upper marginal end edge of the casing for support thereon. The element 112 has an upper end which preferably extends through a bearing 116, preferably of a self-lubricating character, and an apertured planar bearing or member 117 is secured to the shaft and overlies the bearing 108. A lock nut 118 is secured to the threaded element and bears against the member 117 for securing this member, bearing 116 and member 114 in an adjustable operative relationship and cotter pin 119 may be utilized for maintaining these components in such relation after correct adjustment.

The bearing 116 is preferably of the same shape as the bearing 38 above referred, and has an upper generally conical portion 120 having a surface which bears against the underside of the upper bearing or race member 117. If so desired, the bearing 116 may be positioned as the bearing 38. The cross-sectional dimension of the various components are preferably predetermined in order to provide operative tolerances to promote or facilitate rotation of the impeller 102 and one or more blades carried thereby. The arrangement is preferably such that the impeller 102, shaft 103, element 112 and bearing 116 will rotate as a unit relative to the lower bearing member 114, and the latter may rotate to some extent relative to the cylindrical bearing 108. In other words, the impeller is suspended for rotation by the downward flow of a granular product. The contact area between the conical portion 120 of the bearing 116 and the upper member 117 is minimal.

Attention is directed to the fact that the conical or tapered portion 120 of the bearing is preferably such that it will automatically reshape, adjust, deform or accommodate itself to wear. More particularly, in this respect, if the spreader, for example, is utilized for a period of time to spread what may be termed a generally minimal flow of a product fed in the hopper or funnel, the conical portion of the bearing will more or less retain its original shape or contour, in which event, the contact area between the bearings will remain about the same but when, for example, a large stream or flow of a product, is fed into the hopper for a period of time the pressure therefrom will cause the impeller to rotate at a relatively high speed and this speed, plus the pressure exerted by the product against the impeller will cause the bearing to deform so that its contact area with the upper race will increase. Otherwise expressed, the bearing will automatically adjust itself in response to variable increased pressures and variable speeds to an extent whereby to substantially normalize the contact area for efficient operation of the impeller. This increased area due to wear is indicated by the dotted line 121 and a dotted line shown in the bearing 38 is indicated for the same purpose. Obviously, further adjustment by tightening the nut 118 may be required, if the bearing is worn down to the line 121.

OPERATION

The operation of the spreader is relatively simple. The granular product, such as grain, is preferably forcibly fed through the conduit 5 into the hopper 1 from whence it flows downwardly through the outlet 13 to the impeller 2 where the product engages the upper bearing 46, conical formation 48, upper surfaces of the sections 14, and against the blades 16 to effect rotation of the impeller. The upper smooth surfaces of the impeller allow appreciable amounts of the product to freely slide or glide against the inner curved surfaces of the blades to cause such rotation. Obviously, some of the product will flow off the impeller to obtain a spreading of the product without engaging the blades. The spreader disclosed herein has proven very efficient and satisfactory in use and the impeller is caused to rotate within a range between 80 and 120 R.P.M. and the capacity of the spreader for spreading is within a range 1,000 and 10,000 bushels per hour.

Attention is directed to the fact that the product falling off the impeller between the outwardly extending portions 18' may fall in a smaller area or generally conical or circular zone than that directed outwardly by the lower extremities of the blade 16. In other words, the lower extremities of the blades will direct some of the product outwardly to a greater extent or diametrically or conical area greater than that which is not engaged by the inner surfaces of the blades for propelling purposes. It should be obvious that some of the product may also flow over the blades where it may be engaged by forward convex surfaces of the blade. The fact that the lower extremities or ends of the blades project outwardly and generally at an acute angle with reference to the overlapping straight areas of the marginal edge portions of the sections offer a unique setup whereby the force or forces exerted by the product produces what may be termed an added or driving impetus to the impeller. The various flow patterns of the product are exemplified in FIGS. 2, 5 and 6.

Having thus described by invention, it is obvious that various modifications may be made in the same without departing from the spirit of the invention, and therefore, I do not wish to be understood as limiting myself to the exact forms, constructions, arrangements, and combinations of the parts herein shown and described.

I claim:

1. In combination: a hopper for receiving a granular product, said hopper having a lower outlet, a shaft secured in said hopper and extending downwardly through and below said outlet, a generally conical impeller having an upper opening through which said shaft extends, a plurality of spaced spiral blades secured to the upper side of said impeller and a fitting carried by its under side, a housing connected to said shaft, an apertured member disposed in a lower part of said housing and a bearing disposed in said housing and upon said apertured member, and means connected to said fitting and said bearing and extending through said apertured member whereby said bearing engages said member for suspending said spreader thereon for rotation relative to said shaft when such a product flows against said blades.

2. A spreader for a granular product, said spreader comprising a funnel having a lower outlet, an elongated shaft having an upper extremity centrally secured in said funnel and through said outlet and a lower extremity depending therefrom, an impeller structure having sloping surfaces and an upper opening through which said lower extremity extends and being provided with an external curved blade and an internal support, a fitting fixedly secured to said support, a housing carried by said shaft and having a lower apertured portion, an apertured member disposed in said housing in relation to its lower portion, bearing means disposed in said housing, an elongated element connected to said fitting and bearing means and extending through said lower portion and said member whereby said bearing means is supported on said member and said impeller structure is suspended therefrom for rotation in response to a product falling through said outlet onto said conical structure and against said blade.

3. The spreader defined in claim 2, in which the bearing area of support of said bearing means on said member is appreciably less than the maximum cross-dimension of said bearing means and shaft.

4. A spreader for a granular product, said spreader comprising a hopper provided with a lower outlet, an elongated shaft having an upper extremity centrally secured in said hopper and through said outlet and a lower extremity depending therefrom, a generally conical oblong structure having an upper opening through which said lower extremity extends and being provided with an external curved blade and an internal support, a fitting fixedly secured to said support, a housing connected to said lower extremity and having a lower apertured portion, an upper bearing and a lower apertured bearing mounted in said housing, an elongated element extending through said lower bearing, said lower portion and connected to said upper bearing and said fitting in a manner whereby said conical structure is suspended on said lower bearing for rotation in response to such a product falling through said outlet onto said conical structure and against said blade, and said upper bearing having a lower contact area with said lower bearing which is appreciably less than a maximum cross-dimension of said lower bearing whereby to minimize the contact area therebetween in order to facilitate rotation of said conical structure.

5. An impeller assembly for a granular product comprising a generally oblong and conical impeller provided with a center opening and a support at its underside, a shaft extending through said opening and provided with a housing having a lower apertured end wall, an upper bearing and a lower apertured bearing disposed in said housing, an elongated element extending through said end wall and said lower bearing and being connected to said support and said upper bearing for supporting said upper bearing on said lower bearing whereby said upper bearing, impeller and its support may be caused to rotate as a unit relative to said lower bearing, and one of said bearings having a bearing contact with the other bearing which is appreciably less than a maximum cross-dimension of the other whereby to minimize the contact area therebetween.

6. The impeller assembly defined in claim 5, which is provided with upper sloping surfaces of variable contour.

7. A spreader for a granular product, said spreader comprising a funnel structure provided with a lower outlet, an elongated shaft having an extremity centrally secured in said structure through said outlet and a lower extremity depending therefrom, a generally conical oblong structure having an upper opening through which said lower extremity extends, said conical structure being provided with at least one external curved blade, an internal support mounted in one of said structures, a fitting fixedly secured to said support, a housing carried by said shaft and having an end wall, a pair of engaged bearings disposed in said housing, an elongated element extending through said end wall and one of said bearings and being connected to the other bearing and said support in a manner whereby said conical structure is suspended from at least one of said bearings for rotation in response to a product falling through said outlet onto said conical structure and against said blade.

8. The spreader defined in claim 7, in which said conical structure is constructed to provide upper sloping surfaces of variable contour and lower lateral offsets.

9. An impeller assembly for spreading a granular product, a shaft extending upwardly from the impeller of said assembly, an elongated housing mounted in relation to said shaft, a pair of relatively movable bearings mounted in relation to said shaft and housing, one of said bearings having a generally tapered portion engaging the other bearing for minimizing the contact area therebetween, the arrangement being such that the impeller is suspended from said bearings for rotation about the axis of said shaft.

10. The impeller assembly defined in claim 9, in which said one bearing will automatically adjust itself with respect to said other bearing in response to variable increases in pressure applied to the impeller by the product and speed of the impeller.

11. An impeller assembly for a granular product, a shaft connected to said impeller and extending upwardly therefrom, a tubular open-ended housing surrounding an upper extremity of said shaft and affording attachment to a hopper, a pair of axially spaced bearings respectively secured to the upper and lower ends of said housing, a pair of members and a bearing interposed therebetween, and means extending upwardly from said shaft and through said members and bearing for suspending such impeller and shaft as a unit for rotation about the axis of the shaft in response to such a product forced thereagainst.

12. A spreader for a granular product comprising a shaft adapted for attachment to an overhead hopper for disposition centrally in a lower outlet therein and a lower extremity provided with a hollow member having an opening therein for disposition below such a hopper, a generally conical hollow impeller having a blade connected exteriorly thereto and provided with an upper opening and a tubular bearing therein through which said shaft extends, a support mounted under and to said impeller, a fitting carried by said support, bearing means, held in said hollow member, and means extending into said opening into said hollow member from said fitting for operatively connecting said bearing means to said fitting whereby said impeller is substantially suspended for rotation from said bearing means to the exclusion of said tubular bearing when said blade is forcibly engaged by a product for flow downwardly through such an outlet.

13. The spreader defined in claim 12, in which said impeller is provided with different areas of sloping contours whereby to cause spreading of a product in variable wavelike patterns and distances from the axis of said shaft when the impeller is rotated about this axis.

14. The spreader defined in claim 12, in which said bearing means has contact areas which are less or equal to the cross-sectional area of said shaft.

15. A spreader for a granular product comprising a shaft adapted for attachment to an overhead hopper for disposition centrally in a lower outlet therein and a lower extremity for disposition below such a hopper, a generally conical hollow impeller having a blade connected exteriorly thereto and provided with an upper opening and a tubular bearing therein through which said shaft extends, a support mounted under and to said impeller, a fitting carried by said support, bearing means, means operatively connecting said bearing means to said lower extremity and to said fitting whereby said impeller is substantially suspended for rotation to the exclusion of said tubular bearing when said blade is forcibly engaged by a product for flow downwardly through such an outlet, and said connecting means includes a pair of members which are respectively connected to said shaft and said fitting and one of these members serves to substantially house said bearing means.

16. A spreader for a granular product comprising a shaft adapted for attachment to an overhead hopper for disposition centrally in a lower outlet therein and a lower extremity for disposition below such a hopper, a generally conical hollow impeller having a blade connected exteriorly thereto and provided with an upper opening and a tubular bearing therein through which said shaft extends, said impeller being comprised of a plurality of sections of sheet material having edge portions and means securing said edge portions together whereby said sections are connected together in an offset relation with respect to one another, a support mounted under and to said impeller, a fitting carried by said support, bearing means, means operatively connecting said bearing means to said lower extremity and to said fitting whereby said impeller is substantially suspended for rotation to the exclusion of said tubular bearing when said blade is forcibly engaged by a product for flow downwardly through such an outlet, and said connecting means includes a pair of members which are respectively connected to said shaft and said fitting and one of these members serves to substantially house said bearing means.

17. A spreader for a granular product comprising a shaft adapted for attachment to an overhead hopper for disposition centrally in a lower outlet therein and a lower extremity for disposition below such a hopper, a generally conical hollow impeller having blades connected exteriorly thereto and provided with an upper opening and a tubular bearing therein through which said shaft extends, said blade being curved relative to the axis of said shaft, said impeller being provided with substantially diametrically disposed openings adjacent to the upper frontal areas of said blades through which appreciable quantities of a granular product may flow, a support mounted under and to said impeller, a fitting carried by said support, bearing means, means operatively connecting said bearing means to said lower extremity and to said fitting whereby said impeller is substantially suspended for rotation to the exclusion of said tubular bearing when said blade is forcibly engaged by a product for flow downwardly through such an outlet, and said connecting means includes a pair of members which are respectively connected to said shaft and said fitting and one of these members serves to substantially house said bearing means.

18. A spreader for a granular product comprising a shaft adapted for attachment to an overhead hopper for disposition below such a hopper, a generally conical hollow impeller comprised of sections having edge portions and having a blade connected exteriorly thereto provided with an upper opening and a tubular bearing therein through which said shaft extends, fastening means serving to secure said edge portions and said blade to said impeller, a support mounted under and to said impeller, a fitting carried by said support, bearing means, means operatively connecting said bearing means to said lower extremity and to said fitting whereby said impeller is substantially suspended for rotation to the exclusion of said tubular bearing when said blade is forcibly engaged by a product for flow downwardly through such an outlet.

19. A spreader for a granular product comprising a shaft adapted for attachment to an overhead hopper for disposition centrally in a lower outlet therein and a lower extremity for disposition below such a hopper, a generally conical hollow impeller having a blade connected exteriorly thereto and provided with an upper opening and a tubular bearing therein through which said shaft extends, said tubular bearing receiving portions of said impeller for holding said bearing in said opening and serves to protect the apex area of said impeller and assist in controlling relative movement of said impeller with respect to said shaft, a support mounted under and to said impeller, a fitting carried by said support, bearing means, means operatively connecting said bearing means to said lower extremity and to said fitting whereby said impeller is substantially suspended for rotation to the exclusion of said tubular bearing when said blade is forcibly engaged by a product for flow downwardly through such an outlet, and said connecting means includes a pair of members which are respectively connected to said shaft and said fitting and one of these members serves to substantially house said bearing means.

20. A spreader for a granular product comprising a shaft adapted for attachment to an overhead hopper for disposition centrally in a lower outlet therein and a lower extremity for disposition below such a hopper, a generally conical hollow impeller having a blade connected exteriorly thereto and provided with an upper opening and a tubular bearing therein through which said shaft extends, a support mounted under and to said impeller, a fitting carried by said support, bearing means, means operatively connecting said bearing means to said lower extremity and to said fitting whereby said impeller is substantially suspended for rotation to the exclusion of said tubular bearing when said blade is forcibly engaged by a product for flow downwardly through such an outlet, said fitting and said connecting means having predetermined cross-dimensions whereby to allow a predetermined amount of wobble of said impeller with respect to the axis of said shaft, and said connecting means includes a pair of members which are respectively connected to said shaft and said fitting and one of these members serves to substantially house said bearing means.

21. An impeller assembly for spreading a granular product, said structure comprising a hollow substantially conical member provided with spiral blades and a center opening, a tubular bearing disposed in said opening, a fitting attached to the underside of said member, an upstanding elongated element having a lower extremity connected to said fitting, a shaft having an upper extremity for attachment to an overhead hopper and a lower extremity extending freely downwardly through said tubular bearing into said member, a hollow member having a portion attached to said shaft and an end wall provided with an opening and abutment means in said hollow member, said bearing means being connected to said elongated element and disposed in said hollow upon said abutment means and being operatively associated with said fitting and said shaft at a location below said tubular bearing for supporting the weight of said member whereby to facilitate rotation of said member when such a product flows downwardly against said blades from such a hopper.

22. A spreader for a granular product comprising a hopper provided with an upper open extremity and a lower portion provided with an outlet, a shaft disposed centrally in said outlet and having an upper end mounted in said hopper and a lower extremity extending below said hopper, a generally conical hollow impeller having a blade connected exteriorly thereto and provided with an upper opening through which said shaft freely extends, a support mounted under and to said impeller at a location adjacent to its bottom area, a fitting carried by said support, bearing means having contact areas which are less or equal to the cross-sectional area of the shaft, and means operatively connecting said bearing means to said lower extremity and to said fitting whereby substantially the total weight of said impeller is suspended for rotation when said blade is forcibly engaged by a product flowing downwardly through said outlet, said connecting means including a hollow member enclosing said bearing means.

23. The spreader defined in claim 22, in which said hollow member and said fitting are constructed to control wobbling of said impeller.

24. A spreader for a granular product for use with a hopper provided with an upper open extremity and a lower portion provided with an outlet, a shaft having an upper end mounted in said hopper and centrally in said outlet and a lower extremity provided with a hollow enlargement extending below said hopper, a generally conical hollow impeller having a blade connected exteriorly thereto and provided with an upper opening through which said shaft extends, a support mounted under and to said impeller at a location adjacent to its bottom area, a fitting carried by said support, bearing means disposed in said enlargement and having contact areas which are less or equal to the cross-sectional area of the shaft, and means operatively connecting said bearing means and said fitting whereby said impeller is substantially suspended from said bearing means for rotation when said blade is forcibly engaged by a product flowing downwardly through such an outlet.

25. In combination: a hopper for receiving a granular product, said hopper having a lower outlet, a shaft secured in said hopper and extending downwardly through and below said outlet, a generally conical impeller having an upper opening through which said shaft extends, said impeller being constructed of sheet material and having different sloping contours whereby to cause spreading of such a product in variable wave-like patterns and distances from said shaft, a plurality of spaced spiral blades secured to the upper side of said impeller and a fitting carried by its under side, a housing connected to said shaft, an apertured member disposed in a lower part of said housing and a bearing disposed in said housing and upon said apertured member, and means connected to said fitting and said bearing and extending through said apertured member whereby said bearing engages said member for suspending said spreader thereon for rotation relative to said shaft when such a product flows against said blades.

26. A spreader for a granular product for use with a hopper provided with an upper open extremity and a lower portion provided with an outlet, a shaft having an upper end for disposition in said hopper and centrally in such an outlet and a lower extremity extending below such a hopper, a generally conical hollow impeller having a blade connected exteriorly thereto and provided with an upper opening through which said shaft extends, a center support mounted under and to said impeller below said upper opening, a fitting carried by said support, said lower extremity being provided with a hollow enlargement, bearing means confined in said enlargement and having contact areas which are less or equal to the cross-sectional area of the shaft and which comprises a pair of elements having relatively small bearing surfaces whereby to minimize the contact therebetween and promote rotation of said impeller, and means extending axially through said bearing means and operatively connecting said bearing means to said fitting whereby substantially the total weight of said impeller is suspended for rotation when said blade is forcibly engaged by a product flowing downwardly through such an outlet.

27. An assembly comprising an impeller constructed to be driven by a granular product, said impeller comprising curved sections constructed of sheet material, means securing said sections to form an impeller which is hollow, relatively light in weight, substantially conical in shape and has surface areas arranged about a clearance opening provided in its apex, an external spiral blade secured externally to said impeller for engagement by the product to promote rotation of the impeller, said surface areas being disposed on opposite sides of said blade and being of variable contours, a support secured in said impeller and having a center portion located centrally in said impeller below said apex, a thrust bearing assembly mounted on said center portion, and a shaft connected to said bearing assembly and extending upwardly through said opening for attachment to a hopper whereby said impeller may rotate relative to the axis of said shaft, a hollow member carried by said shaft, and said bearing assembly being housed in said hollow member and providing subtantially the sole support for said impeller and comprising at least a pair of relatively movable elements.

28. A spreader for a granular product comprising a hopper provided with an upper open extremity and a lower portion provided with an outlet, a shaft disposed centrally in said outlet and having an upper end mounted in said hopper and a lower extremity extending below said hopper, a generally conical hollow impeller having a blade connected exteriorly thereto and provided with an upper opening through which said shaft extends, a support mounted under and to said impeller at a location adjacent to its bottom area, a fitting carried by said support, bearing means having contact areas which are less or equal to the cross-sectional area of the shaft and which comprises a pair of elements having relatively small bearing surfaces whereby to minimize the contact area therebetween and promote rotation of said impeller and one of said elements has a tapered portion, and means operatively connecting said bearing means to said lower extremity and to said fitting whereby said impeller is suspended for rotation when said blade is forcibly engaged by a product flowing downwardly through said outlet.

29. A spreader for a granular product comprising a hopper provided with an upper open extremity and a lower portion provided with an outlet, a shaft disposed centrally in said outlet and having an upper end mounted in said hopper and a lower extremity extending below said hopper, a generally conical hollow impeller comprised of sections having overlapping edge portions and a blade connected exteriorly thereto and provided with an upper opening through which said shaft extends, and fastening means serving the dual purpose of securing said edge portions and connecting said blade to said impeller, a support mounted under and to said impeller at a location adjacent to its bottom area, a fitting carried by said support, bearing means having contact areas which are less or equal to the cross-sectional area of the shaft and which comprises a pair of elements having relatively small bearing surfaces whereby to minimize the contact area therebetween and promote rotation of said impeller and one of said elements has a tapered portion, and means operatively connecting said bearing means to said lower extremity and to said fitting whereby said impeller is suspended for rotation when said blade is forcibly engaged by a product flowing downwardly through said outlet.

30. A spreader for a granular product for use with a hopper provided with an upper open extremity and a lower portion provided with an outlet, a shaft adapted for disposition centrally in such an outlet and having an upper end for attachment to such a hopper and a lower extremity for disposition below such a hopper, a generally conical hollow impeller comprised of sections having edge portions and a blade connected exteriorly thereto and provided with an upper opening through which said shaft extends, and fastening means serving to secure said edge portions and connecting said blade to said impeller, a support mounted under and to said impeller at a location adjacent to its bottom area, a fitting carried by said support, bearing means having contact areas which are less or equal to the cross-sectional area of the shaft and which comprises a pair of elements having relatively small bearing surfaces whereby to minimize the contact area therebetween and promote rotation of said impeller and one of said elements has a tapered portion, and means operatively connecting said bearing means to said lower extremity and to said fitting whereby said impeller is suspended for rotation when said blade is forcibly engaged by a product flowing downwardly through such an outlet.

31. A spreader for a granular product for use with a hopper having a lower outlet for the product, a shaft having an upper end for attachment to such a hopper for locating said shaft centrally in such an outlet, a generally conical impeller having an apex provided with an opening through which said shaft extends, a fitting fixedly secured to said impeller an appreciable distance below said apex, and means connecting said shaft and fitting whereby said impeller is substantially supported thereby for rotation about the axis of said shaft, said connecting means including a member which is cooperable with said fitting in such a manner that said impeller may wobble a predetermined extent during its rotation.

* * * * *